(12) United States Patent
Ishikawa et al.

(10) Patent No.: US 10,994,586 B2
(45) Date of Patent: May 4, 2021

(54) VEHICLE AIR-CONDITIONING DEVICE

(71) Applicant: MARELLI CABIN COMFORT JAPAN CORPORATION, Saitama (JP)

(72) Inventors: Takayuki Ishikawa, Saitama (JP); Yunhan Ri, Saitama (JP); Koujirou Nakamura, Saitama (JP); Tomohiro Maeda, Saitama (JP); Shuuji Kumamoto, Saitama (JP)

(73) Assignee: MARELLI CABIN COMFORT JAPAN CORPORATION, Saitama (JP)

( * ) Notice: Subject to any disclaimer, the term of this patent is extended or adjusted under 35 U.S.C. 154(b) by 63 days.

(21) Appl. No.: 15/539,456

(22) PCT Filed: Dec. 17, 2015

(86) PCT No.: PCT/JP2015/085351
§ 371 (c)(1),
(2) Date: Jun. 23, 2017

(87) PCT Pub. No.: WO2016/104320
PCT Pub. Date: Jun. 30, 2016

(65) Prior Publication Data
US 2017/0361679 A1    Dec. 21, 2017

(30) Foreign Application Priority Data
Dec. 24, 2014  (JP) .............................. JP2014-260763

(51) Int. Cl.
*B60H 1/00*    (2006.01)
*F24F 11/89*   (2018.01)
(Continued)

(52) U.S. Cl.
CPC ..... *B60H 1/00807* (2013.01); *B60H 1/00007* (2013.01); *B60H 1/00921* (2013.01);
(Continued)

(58) Field of Classification Search
CPC ............ B60H 1/00807; B60H 1/00921; B60H 1/023; B60H 2001/3263;
(Continued)

(56) References Cited

U.S. PATENT DOCUMENTS 5,704,217 A * 1/1998 Itoh ...................... B60H 1/3207
                                                        62/150
6,205,800 B1 * 3/2001 Topper .................. A47F 3/0404
                                                        62/128
(Continued)

FOREIGN PATENT DOCUMENTS

EP    2 695 758 A1    2/2014
FR    2660087 A1 *   11/2013
(Continued)

OTHER PUBLICATIONS

Aoki, Refrigerating Device, Sep. 25, 2008, JP2008224135A, Whole Document (Year: 2008).*
(Continued)

*Primary Examiner* — Larry L Furdge
(74) *Attorney, Agent, or Firm* — Foley & Lardner LLP

(57) ABSTRACT

A vehicle air-conditioning device is a heat pump type vehicle air-conditioning device including an external heat exchanger that performs heat exchange between refrigerant flowing the inside thereof and outside air. With the vehicle air-conditioning device, a controller functions as a temperature-difference calculation unit that calculates the temperature difference ΔT between the refrigerant in a refrigerant flow path on the exit side of the external heat exchanger and the outside air, and in addition, the controller functions as a
(Continued)

frost formation determination unit that determines that frost formation is caused on the external heat exchanger on the basis of the elapsed time to of a state in which the temperature difference ΔT is equal to or larger than a frost-formation temperature difference at which the frost formation may be caused on the external heat exchanger.

11 Claims, 7 Drawing Sheets

(51) Int. Cl.
*F25B 47/02* (2006.01)
*B60H 1/22* (2006.01)
*B60H 1/32* (2006.01)
*B60S 1/02* (2006.01)

(52) U.S. Cl.
CPC ............... *B60H 1/22* (2013.01); *B60H 1/321* (2013.01); *B60S 1/023* (2013.01); *F24F 11/89* (2018.01); *F25B 47/02* (2013.01); *B60H 2001/00961* (2019.05); *B60H 2001/3261* (2013.01); *B60H 2001/3263* (2013.01)

(58) Field of Classification Search
CPC ........ B60H 2001/3261; B60H 1/00007; B60H 1/22; B60H 1/321; B60S 1/023; F24F 11/89; F25B 47/02
See application file for complete search history.

(56) References Cited

U.S. PATENT DOCUMENTS

| | | |
|---|---|---|
| 2002/0036080 A1 | 3/2002 | Itoh et al. |
| 2012/0227428 A1* | 9/2012 | Yokoo ................ B60H 1/00921 62/126 |
| 2014/0041404 A1* | 2/2014 | Tsunoda ................. B60S 1/023 62/156 |
| 2014/0298838 A1 | 10/2014 | Morishita et al. |
| 2016/0084554 A1 | 3/2016 | Suzuki et al. |

FOREIGN PATENT DOCUMENTS

| | | | |
|---|---|---|---|
| JP | S57164245 A | * 10/1982 | |
| JP | H11-287538 A | 10/1999 | |
| JP | 2002-174474 A | 6/2002 | |
| JP | 2008224135 A | * 9/2008 | |
| JP | 2013-129353 A | 7/2013 | |
| JP | 2014-231262 A | 12/2014 | |
| WO | WO-2014084343 A1 | * 6/2014 | ............... F25B 5/02 |

OTHER PUBLICATIONS

Bernard et al., Method for Slowing the Icing of an Air Conditioning System . . . , Nov. 6, 2013, EP2660087A1, Whole Document (Year: 2013).*
Kobayashi et al., Air Conditioner, Oct. 8, 1982, JPS57164245A, Whole Document (Year: 1982).*
Suzuki et al., Vehicle Air Conditioning Device, Jun. 5, 2014, WO2014084343A1, Whole Document (Year: 2014).*

* cited by examiner

VEHICLE AIR-CONDITIONING DEVICE

TECHNICAL FIELD

The present invention relates to a vehicle air-conditioning device.

BACKGROUND ART

JP2013-129353A discloses a vehicle air-conditioning device provided with a frost formation determination unit that determines whether or not frost formation is caused on an external evaporator. The vehicle air-conditioning device disclosed in JP2013-129353A performs a frost-formation determination in which the frost formation is determined to be caused when a temperature difference between a detected value from an outside temperature sensor and a detected value from a refrigerant temperature sensor of the external evaporator reaches or exceeds a predetermined value even for an instant of time.

SUMMARY OF INVENTION

However, even when the frost formation is not actually caused, a temperature difference between exit-side refrigerant in an external heat exchanger and outside air may be increased temporarily when, for example, a vehicle runs a place where there is an abrupt change in the outside temperature, such as an entrance/exit of a tunnel etc. Therefore, with the vehicle air-conditioning device of JP2013-129353A that determines that the frost formation is caused when the temperature difference reaches or exceeds the predetermined value even for an instant of time, it is not possible to cope with the above-mentioned case, and there is a risk in that it is erroneously determined that the frost formation is caused even when the frost formation is not caused.

The present invention is made in order to solve the above-mentioned problem, and an object thereof is to provide a vehicle air-conditioning device capable of precisely determining occurrence of frost formation without performing erroneous determination even in the case in which a temperature difference between exit-side refrigerant in an external heat exchanger and outside air is temporarily increased due to change in a running situation of a vehicle etc.

According to one aspect of the present invention, a heat pump type vehicle air-conditioning device is provided with an external heat exchanger performing heat exchange between refrigerant flowing inside thereof and outside air. The vehicle air-conditioning device comprises a temperature-difference calculation unit configured to calculate a temperature difference between exit-side refrigerant in the external heat exchanger and the outside air, and a frost formation determination unit configured to determine that frost formation is caused on the external heat exchanger based on an elapsed time of a state in which the temperature difference at time of heating operation is equal to or larger than a frost-formation temperature difference at which the frost formation may be caused on the external heat exchanger.

According to the above-mentioned aspects, it is determined that frost formation is caused based on elapsed time of a state in which a temperature difference calculated by a temperature-difference calculation unit is equal to or larger than a frost-formation temperature difference. Therefore, even when the temperature difference is increased so as to temporarily reach or exceed the frost-formation temperature difference, it is possible to precisely determine occurrence of the frost formation without performing erroneous determination.

DESCRIPTION OF EMBODIMENTS

Embodiments of the present invention will be described below with reference to the drawings.

First Embodiment

Figure 1:
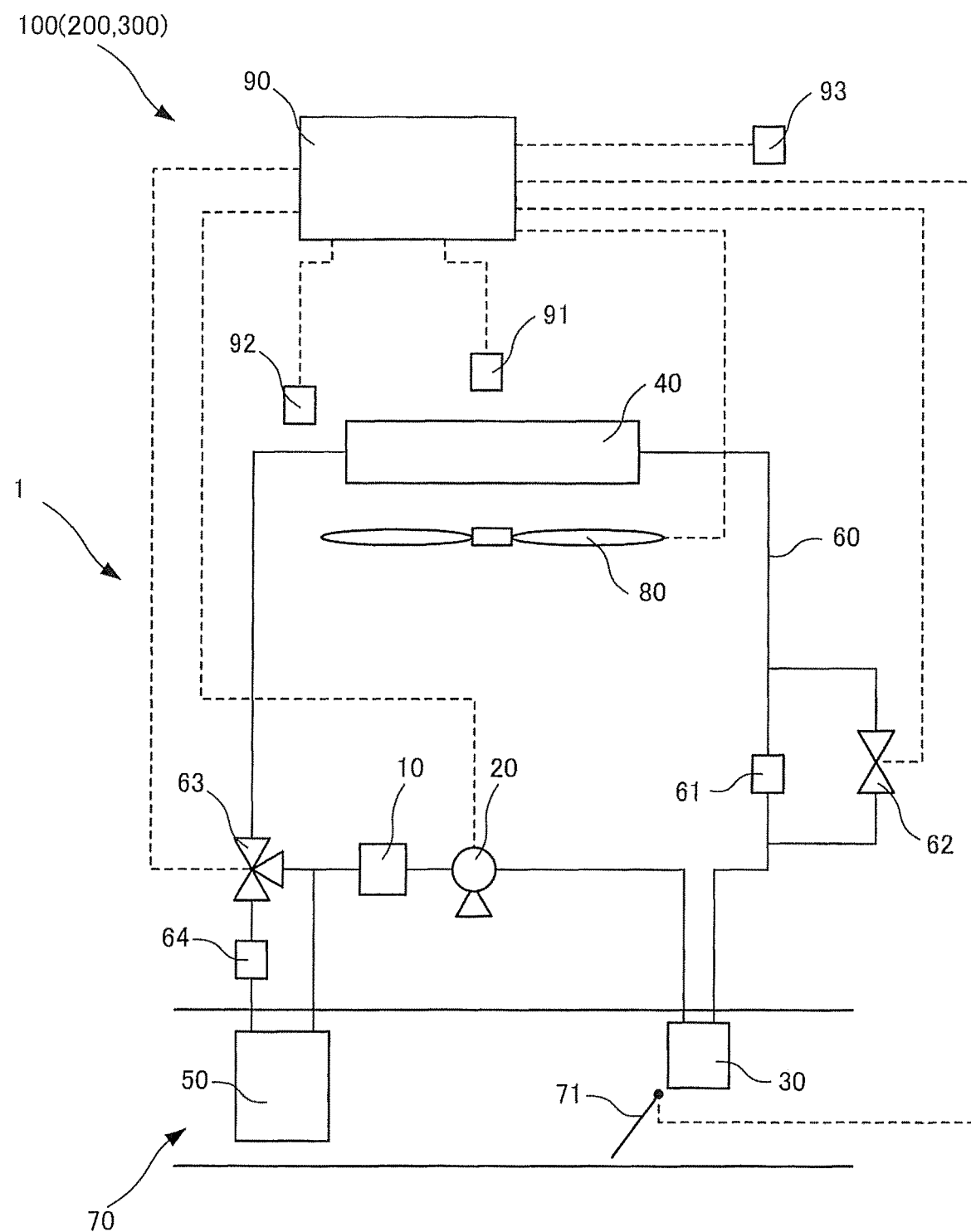
FIG. 1 is a system configuration diagram of a vehicle air-conditioning device according to an embodiment of the present invention.

FIG. 1 is a system configuration diagram of a vehicle air-conditioning device 100 according to a first embodiment of the present invention.

The vehicle air-conditioning device 100 includes a heat pump cycle 1, an HVAC unit (Heating Ventilation and Air Conditioning Unit) 70, and a controller 90.

The heat pump cycle 1 includes a refrigerant flow path 60 through which refrigerant flows, an accumulator 10 that is provided in the refrigerant flow path 60 and performs gas/liquid separation of the refrigerant, a compressor 20 that compresses the refrigerant, a condenser 30 that releases heat of the high-pressure refrigerant, an external heat exchanger 40 that performs heat exchange between the refrigerant and the outside air, and an evaporator 50 that causes the heat of the surrounding air to be absorbed into the refrigerant. As the refrigerant, for example, HFC-134a etc. is used.

The accumulator 10 performs gas/liquid separation on the refrigerant flowing through the refrigerant flow path 60 such that the refrigerant is separated into the gaseous refrigerant and the liquid refrigerant. The accumulator 10 only allows the separated gaseous refrigerant to flow into the compressor 20.

The compressor 20 is disposed at the downstream side of the accumulator 10 and sucks and compresses the gaseous refrigerant that has passed through the accumulator 10. The temperature of the gaseous refrigerant is increased by being compressed by the compressor 20.

The condenser 30 is disposed at the downstream side of the compressor 20. The condenser 30 releases the heat of the gaseous refrigerant into the surrounding air. The refrigerant, the heat of which has been released, is condensed and becomes the liquid refrigerant. Because the pressure of the gaseous refrigerant supplied to the condenser 30 is increased by the compressor 20, the refrigerant is easily liquefied only by being cooled to the temperature similar to that of the surrounding air.

The external heat exchanger 40 performs the heat exchange between the refrigerant flowing the inside thereof and the outside air. The outside air is introduced to the external heat exchanger 40 by running of a vehicle or rotation of a motor fan 80.

The evaporator 50 causes the heat of the surrounding air of the evaporator 50 to be absorbed into the refrigerant flowing the inside thereof. The refrigerant that has absorbed the heat at the evaporator 50 flows into the accumulator 10. Because the refrigerant that has passed through the evaporator 50 has absorbed the heat, it is easily vaporized, and so, the proportion of the gaseous refrigerant is increased.

In the refrigerant flow path 60, a first expansion valve 61 and a solenoid valve 62 are disposed in parallel between the condenser 30 and the external heat exchanger 40. In addition, in the refrigerant flow path 60, a three-way valve 63 and a second expansion valve 64 are disposed in series between the external heat exchanger 40 and the evaporator 50.

At the first expansion valve 61, the refrigerant flowing from the condenser 30 is decompressed and expanded. The refrigerant that has been compressed and the pressure of which has been increased by the compressor 20 at the upstream side of the condenser 30 is decompressed and expanded by being injected from a small hole of the first expansion valve 61 and becomes the low-temperature refrigerant in the form of mist.

The solenoid valve 62 is closed at the time of a heating operation and is opened at the time of a cooling operation or a dehumidificating-heating operation. Because the solenoid valve 62 is closed at the time of the heating operation, the refrigerant flowing from the condenser 30 becomes the refrigerant in the form of mist by being decompressed and expanded by passing through the first expansion valve 61 as described above, and flows into the external heat exchanger 40. Because the solenoid valve 62 is opened at the time of the cooling operation or the dehumidificating-heating operation, the refrigerant flowing from the condenser 30 flows into the external heat exchanger 40 through the solenoid valve 62 while maintaining the high-presser.

The three-way valve 63 is disposed so as to be able to switch the flow of the refrigerant flowing from the external heat exchanger 40 to the evaporator 50 through the second expansion valve 64. In the heat pump cycle 1, by switching the three-way valve 63, a flow path through which the refrigerant flows into the second expansion valve 64 and the evaporator 50 and a flow path through which the refrigerant flows into the accumulator 10 by bypassing the second expansion valve 64 and the evaporator 50 are switched. The refrigerant, the flow of which has been switched by the three-way valve 63, flows into the accumulator 10 without flowing through the second expansion valve 64 and the evaporator 50.

The refrigerant flowing from the three-way valve 63 is decompressed and expanded at the second expansion valve 64 and then flows into the evaporator 50. The high-pressure refrigerant is decompressed and expanded by being injected from a small hole of the second expansion valve 64 and becomes the low-temperature refrigerant in the form of mist.

The HVAC unit 70 adjusts the temperature in a vehicle cabin to a preset temperature by performing the cooling operation, heating operation, or the dehumidificating-heating operation on the air introduced into the vehicle cabin.

The condenser 30 and the evaporator 50 are disposed in the HVAC unit 70, and the heat exchange is performed between the air that has been taken in and the refrigerant flowing through the condenser 30 and the evaporator 50. When the heating operation is not performed, the HVAC unit 70 shuts off the flow of the air at the upstream side of the condenser 30 with an air mix door 71 such that the air that has been taken in does not hit the condenser 30. A bypass passage bypassing the condenser 30 may be provided in the refrigerant flow path 60 of the heat pump cycle 1.

The controller 90 is formed of a CPU, a ROM, a RAM, and so forth, and various functions of the vehicle air-conditioning device 100 are exhibited by reading out programs stored in the ROM with the CPU.

A signal from an outside temperature sensor 91, a signal from an exit-side refrigerant temperature sensor 92, a signal from a vehicle speed sensor 93, ON/OFF signals of the motor fan 80, and so forth are input to the controller 90.

The outside temperature sensor 91 is a sensor that detects the temperature of the outside air before taken into the external heat exchanger 40 as an outside temperature Ta.

The exit-side refrigerant temperature sensor 92 is a sensor that detects the temperature of the refrigerant flowing in the refrigerant flow path 60 at the exit side of the external heat exchanger 40 as an exit-side refrigerant temperature Tr. The exit-side refrigerant temperature sensor 92 may directly detect the temperature of the refrigerant in the refrigerant flow path 60, or may detect the temperature of the surface of piping of the refrigerant flow path 60 as the temperature of the refrigerant. In addition, the exit-side refrigerant temperature sensor 92 may detect the temperature of the refrigerant at the vicinity of an exit of a main body of the external heat exchanger 40.

The vehicle speed sensor 93 is, for example, a wheel speed sensor that detects the rotation speed of a wheel. On the basis of the rotation speed of the wheel detected by the vehicle speed sensor 93, the running speed of the vehicle is obtained as a vehicle speed V. The vehicle speed V may be obtained by detecting the rotation rate of an axle shaft and computing the rotation speed of the wheel. In addition, a sensor for detecting the vehicle speed V may be provided separately.

The controller 90 performs, on the basis of the input signals, an air conditioning control by controlling operation of the motor fan 80, the compressor 20, and the air mix door 71. In addition, the controller 90 controls, on the basis of signals from an A/C switch (not shown) etc., the flow path direction of the three-way valve 63 by opening/closing the solenoid valve 62.

Here, the air conditioning control executed by the vehicle air-conditioning device 100 will be described. With the vehicle air-conditioning device 100, the controller 90 performs, on the basis of the signals from the A/C switch etc., determination of the cooling operation request, the heating operation request, or the dehumidificating-heating operation request in the vehicle cabin, and executes the air conditioning control.

When the cooling operation is performed, the controller 90 opens the solenoid valve 62, switches the three-way valve 63 to the second expansion valve 64 side, and shuts off the flow of the air at the upstream side of the condenser 30 with the air mix door 71. The refrigerant that has been compressed and the temperature of which has been increased in the compressor 20 passes through the condenser 30 without undergoing the heat exchange, flows into the external heat exchanger 40 from the opened solenoid valve 62, and is cooled by undergoing the heat exchange with the outside air in the external heat exchanger 40. The refrigerant that has been cooled by the heat exchange with the outside air passes through the three-way valve 63, is further cooled by being decompressed and expanded at the second expansion valve 64, and flows into the compressor 20 through the accumulator 10 after undergoing the heat exchange in the evaporator 50 with the air to be introduced into the vehicle cabin. The air to be introduced into the vehicle cabin, which has been taken into the HVAC unit 70, is cooled by undergoing the heat exchange with the low-temperature refrigerant at the evaporator 50, and thereby, the cooling operation is performed in the vehicle cabin.

When the heating operation is performed, the controller 90 closes the solenoid valve 62, switches the three-way valve 63 to the accumulator 10 side, and opens the air mix door 71 such that the air can flow towards the upstream side of the condenser 30. The refrigerant that has been compressed and the temperature of which has been increased in the compressor 20 is cooled by undergoing the heat exchange with the air to be introduced into the vehicle cabin in the condenser 30. Thereafter, the refrigerant is further cooled by being decompressed and expanded by being injected from the first expansion valve 61 and flows into the external heat exchanger 40. The refrigerant, the temperature of which is lower than that of the outside air, is heated by undergoing the heat exchange with the outside air in the external heat exchanger 40, and thereafter, flows into the compressor 20 by passing through the three-way valve 63 and the accumulator 10. The air to be introduced into the vehicle cabin, which has been taken into the HVAC unit 70, is heated by the high-temperature refrigerant at the condenser 30, and thereby, the heating operation is performed in the vehicle cabin.

When the dehumidificating-heating operation is performed, the controller 90 closes the solenoid valve 62, switches the three-way valve 63 to the second expansion valve 64 side, and opens the air mix door 71 such that the air can flow towards the upstream side of the condenser 30. The refrigerant that has been compressed and the temperature of which has been increased in the compressor 20 is cooled by undergoing the heat exchange with the air to be introduced into the vehicle cabin in the condenser 30. Thereafter, the refrigerant is further cooled by being decompressed and expanded by being injected from the first expansion valve 61 and flows into the external heat exchanger 40. The refrigerant, the temperature of which is lower than that of the outside air, is heated by undergoing the heat exchange with the outside air in the external heat exchanger 40, and thereafter, passes through the three-way valve 63 and is cooled by being decompressed and expanded at the second expansion valve 64. The cooled refrigerant flows into the compressor 20 through the accumulator 10 after undergoing the heat exchange with the air to be introduced into the vehicle cabin in the evaporator 50. The air to be introduced into the vehicle cabin, which has been taken into the HVAC unit 70, is cooled and dehumidified by being cooled by the low-temperature refrigerant at the evaporator 50, and thereafter, becomes dry warm air by being reheated at the condenser 30. Thereby, the dehumidificating-heating operation is performed in the vehicle cabin.

As described above, the vehicle air-conditioning device 100 executes the air conditioning control in accordance with the cooling operation request, the heating operation request, or the dehumidificating-heating operation request in the vehicle cabin. When the heat exchange is normally performed between the outside air and the refrigerant at the external heat exchanger 40, the exit-side refrigerant temperature Tr in the external heat exchanger 40 approaches the outside temperature Ta.

However, in the case in which the heating operation and the dehumidificating-heating operation are performed, in other words, in the case in which the heating operation is ON, the refrigerant having the temperature lower than that of the outside air flows through the inside of the external heat exchanger 40. Water vapor in the outside air around the external heat exchanger 40 is condensed and attaches to the external heat exchanger 40 by being cooled to the temperature equal to or lower than the dew-point temperature by the very-low temperature refrigerant. When the condensed water is cooled to the temperature equal to or lower than the freezing temperature by the very-low temperature refrigerant, there is a risk in that the condensed water freezes and frost formation is caused on the external heat exchanger 40. When the frost formation is caused on the external heat exchanger 40, the heat exchange performed between the refrigerant flowing in the external heat exchanger 40 and the outside air is inhibited by the frost formation, and there is a risk in that the heating efficiency and the reheating efficiency at the condenser 30, in other words, the efficiency of the heating operation of the vehicle air-conditioning device 100 is deteriorated.

Figure 2:
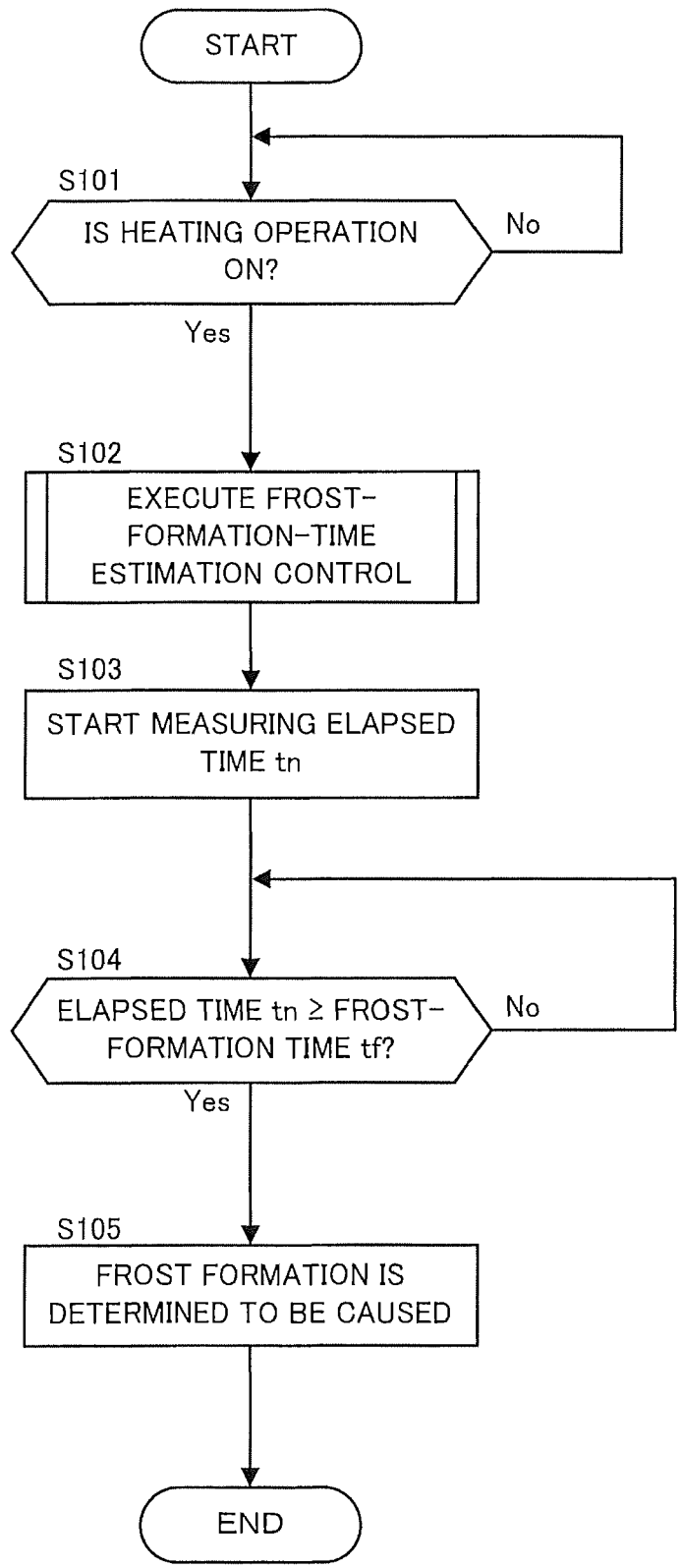
FIG. 2 is a flowchart of a frost-formation determination control executed by a controller of a vehicle air-conditioning device according to a first embodiment of the present invention.

Thus, during the heating operation, the vehicle air-conditioning device 100 performs a frost-formation determination control described below and determines the occurrence of the frost formation on the external heat exchanger 40. FIG. 2 is a flowchart of the frost-formation determination control executed by the controller 90 of the vehicle air-conditioning device 100.

In Step S101, the controller 90 determines whether or not the heating operation is ON. In the case in which the heating operation is ON, the controller 90 executes the process of Step S102. In the case in which the heating operation is not ON, the controller 90 executes the process of Step S101 continuously.

Figure 3:
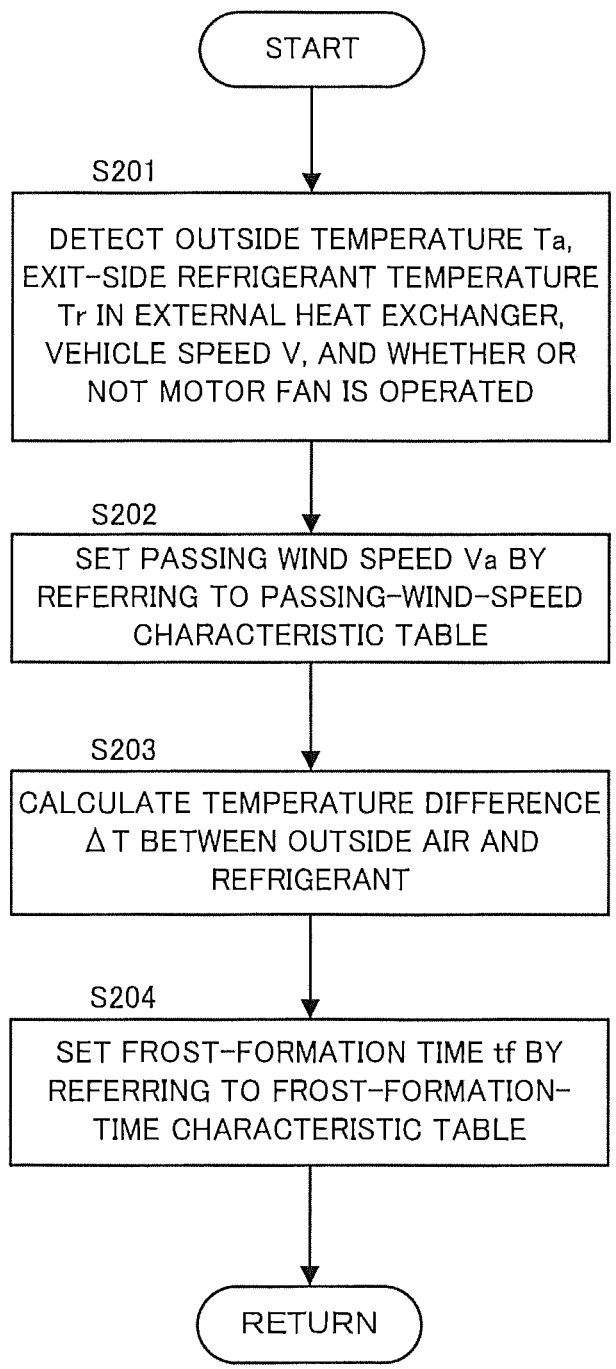
FIG. 3 is a flowchart of a frost-formation-time estimation control executed by the controller.

In Step S102, the controller 90 executes a frost-formation-time estimation control. Here, the frost-formation-time estimation control executed by the controller 90 will be described with reference to FIG. 3. FIG. 3 is a flowchart of the frost-formation-time estimation control.

In Step S201, the controller 90 detects the outside temperature Ta, the exit-side refrigerant temperature Tr in the external heat exchanger 40, and the vehicle speed V on the basis of the signal from the outside temperature sensor 91, the signal from the exit-side refrigerant temperature sensor 92, and the signal from the vehicle speed sensor 93 that have been input. In addition, the controller 90 detects whether or not the motor fan 80 is operated on the basis of the ON/OFF signals of the motor fan 80.

Figure 4:
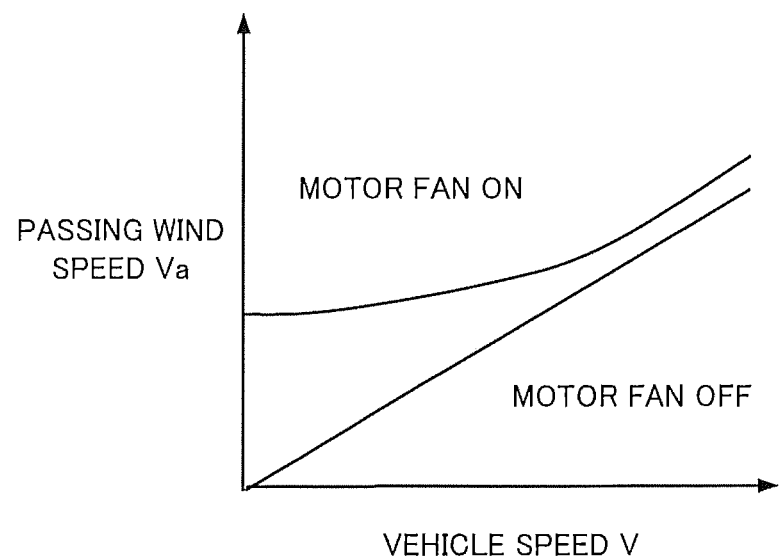
FIG. 4 is a passing-wind-speed characteristic table that is referred to by the controller.

In Step S202, the controller 90 sets a passing wind speed Va by referring to a passing-wind-speed characteristic table shown in FIG. 4. The passing wind speed Va is a speed of the outside air passing through the external heat exchanger 40. In FIG. 4, the horizontal axis is taken as the vehicle speed V, and the vertical axis is taken as the passing wind speed Va. FIG. 4 shows the respective characteristics of the passing wind speed in the cases in which the motor fan 80 is ON/OFF.

As shown in FIG. 4 the passing wind speed Va increases as the vehicle speed V is increased. In addition, in the case in which the motor fan 80 is OFF and is not operated, the passing wind speed Va decreases as the vehicle speed V is decreased, and in the case in which the motor fan 80 is ON and is operated, because the outside air sucked in by the rotation the motor fan 80, the value of the passing wind speed Va is kept constant even when the vehicle speed V is decreased.

In Step S203, on the basis of the exit-side refrigerant temperature Tr and the outside temperature Ta detected, the controller 90 calculates a temperature difference ΔT between the refrigerant in the refrigerant flow path 60 on the exit side of the external heat exchanger 40 and the outside air. In the case in which the frost formation is not caused on the external heat exchanger 40, because the heat exchange is normally performed between the refrigerant and the outside air, the temperature difference ΔT is small. On the other hand, in the case in which the frost formation is caused on the external heat exchanger 40, because the heat exchange cannot be performed normally between the refrigerant and the outside air, and because the refrigerant passes through the exit of the external heat exchanger 40 while it is kept at very-low temperature, the temperature difference ΔT is increased so as to reach or exceed a frost-formation temperature difference at which the frost formation may be caused on the external heat exchanger 40. As described above, the controller 90 functions as a temperature-difference calculation unit of the vehicle air-conditioning device 100.

In this embodiment, although the exit-side refrigerant temperature Tr is detected by using the exit-side refrigerant temperature sensor 92 as described above, instead of this configuration, the exit-side refrigerant temperature Tr may be estimated on the basis of discharge pressure and rotation speed of the compressor 20, an amount of heat released from the condenser 30, and so forth.

In Step S204, the controller 90 estimates a frost-formation time tf, on the basis of the temperature difference ΔT calculated and the passing wind speed Va. The frost-formation time tf is a time period where the frost formation is progressed to the extent that a heat exchangeability at the external heat exchanger 40 is affected as the water vapor around the external heat exchanger 40 is cooled and frozen. The frost-formation time tf is, for example, in the case in which the state where the temperature difference ΔT is equal to or larger than the frost-formation temperature difference is continued, the time period between the starting point of the state (the time point at which the temperature difference ΔT has reached or exceeded the frost-formation temperature difference) to the end point (the time point at which the frost formation has progressed extensively such that the amount of air passing through the external heat exchanger 40 is decreased, or the time point at which most portions of heat exchange tubes or fins of the external heat exchanger 40 are frosted).

Figure 5:
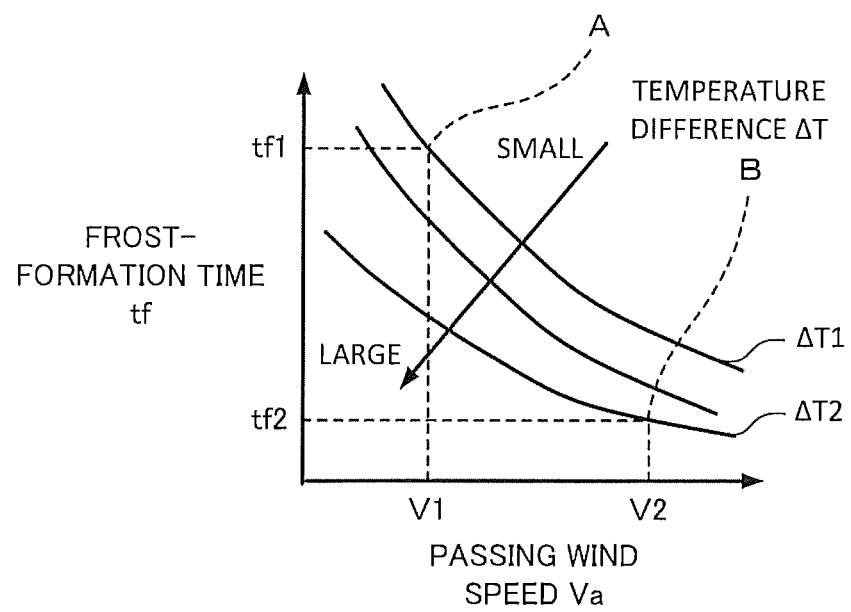
FIG. 5 is a frost-formation-time characteristic table that is referred to by the controller.

The frost-formation time tf in this embodiment is set by referring to a frost-formation-time characteristic table shown in FIG. 5. In FIG. 5, the horizontal axis is taken as the passing wind speed Va, and the vertical axis is taken as the frost-formation time tf. FIG. 5 shows a relationship, which changes in accordance with the temperature difference ΔT, between the passing wind speed Va and the frost-formation time tf. In the case in which the exit-side refrigerant temperature Tr in the external heat exchanger 40 is higher than 0° C., even when condensation is caused on the surface of the external heat exchanger 40, the condensed water does not freeze, and so, the frost-formation time tf is not set.

As shown in FIG. 5, the frost-formation time tf becomes shorter time period as the passing wind speed Va becomes higher because the outside air containing the water vapor is continuously introduced to the area around the external heat exchanger 40. In addition, the frost-formation time tf becomes shorter time period as the temperature difference ΔT becomes larger because the outside air is cooled to a greater extent at the vicinity of the exit of the external heat exchanger 40.

Here, in a running situation of a vehicle, when the temperature difference ΔT is a first temperature difference ΔT1 and the passing wind speed Va is a first passing wind speed V1, the controller 90 specifies a point A by referring to the frost-formation-time characteristic table shown in FIG. 5 and derives that the frost-formation time tf is a first frost-formation time tf1.

In addition, in the case in which the running situation of the vehicle is changed, and the temperature difference ΔT has become a second temperature difference ΔT2 that is larger than the first temperature difference ΔT1 and the passing wind speed Va has become V2 that is faster than V1, the controller 90 specifies a point B by referring to the frost-formation-time characteristic table shown in FIG. 5 and derives that the frost-formation time tf is a second frost-formation time tf2 that is shorter than the first frost-formation time tf1. As described above, in the process of Step S204 shown in FIG. 3, the controller 90 sets the frost-formation time tf, thereby functioning as a frost-formation time estimation unit of the vehicle air-conditioning device 100.

As described above, the controller 90 performs the frost-formation-time estimation control, and thereafter, returns to the flowchart of the frost-formation determination control shown in FIG. 2 and executes the process of Step S103.

In Step S103, the controller 90 starts to measure an elapsed time tn. The elapsed time tn is a time period during which the state in which the temperature difference ΔT between the outside air and the very-low temperature refrigerant is equal to or larger than the frost-formation temperature difference at which the frost formation may be caused on the external heat exchanger 40 is continued.

In Step S104, the controller 90 determines whether or not the elapsed time tn is equal to or longer than the frost-formation time tf. In the case where the elapsed time tn is shorter than the frost-formation time tf, the controller 90 continues to execute the process of Step S104, and when the elapsed time tn is equal to or longer than the frost-formation time tf, the controller 90 executes the process of Step S105.

In Step S105, the controller 90 determines that the frost formation is caused on the external heat exchanger 40. As the frost formation is determined to be caused, the vehicle air-conditioning device 100 appropriately performs process such as a defrosting operation, a heating operation using a separate heat source (not shown), and so forth. As described above, the controller 90 functions as a frost formation determination unit of the vehicle air-conditioning device 100.

With the vehicle air-conditioning device 100 according to the above-mentioned first embodiment, following effects can be achieved.

The vehicle air-conditioning device 100 is the heat pump type vehicle air-conditioning device including the external heat exchanger 40 that performs the heat exchange between the refrigerant flowing the inside thereof and the outside air. With the vehicle air-conditioning device 100, the controller 90 functions as the temperature-difference calculation unit that calculates the temperature difference ΔT between the refrigerant in the refrigerant flow path 60 on the exit side of the external heat exchanger 40 and the outside air, and in addition, the controller 90 functions as the frost formation determination unit that determines that the frost formation is caused on the external heat exchanger 40 on the basis of the duration of the elapsed time tn of the state in which the temperature difference ΔT is equal to larger than the frost-formation temperature difference at which the frost formation may be caused on the external heat exchanger 40.

In addition, with the vehicle air-conditioning device 100, the controller 90 functions as the frost-formation time estimation unit that estimates the frost-formation time tf at which the frost formation that may affect the heat exchangeability at the external heat exchanger 40 is caused. The controller 90 serving as the frost-formation time estimation unit estimates the frost-formation time tf to be shorter when the temperature difference ΔT is larger. The controller 90 serving as the frost formation determination unit determines that, in the case in which the elapsed time tn is equal to or longer than the frost-formation time tf, the frost formation that may affect the heat exchangeability at the external heat exchanger 40 (the extent of the frost formation at which, for example, one surface of the external heat exchanger 40 is frosted and the heat exchangeability is deteriorated) is caused.

With the above-mentioned vehicle air-conditioning device 100, because the frost formation is determined to be caused when the elapsed time tn is equal to or longer than the frost-formation time tf, even when the temperature difference ΔT reaches or exceeds the frost-formation temperature difference temporarily, it is possible to precisely determine the occurrence of the frost formation without performing the erroneous determination. In addition, because the frost-formation time tf is set to be shorter when the temperature difference ΔT is increased and the frost formation tends to be caused within a shorter period of time, it is possible to, precisely and in a short period of time, determine that the frost formation is caused. In addition, in the case in which the temperature difference ΔT is large, although there a risk in that the frost formation has already been caused and the heat exchange has been hindered, because the frost-formation time tf is set to be shorter, it is possible to determine, in a short period of time, that the frost formation is caused.

With the vehicle air-conditioning device 100, the controller 90 serving as the frost-formation time estimation unit sets the frost-formation time tf on the basis of the temperature difference ΔT and the passing wind speed Va of the outside air passing through the external heat exchanger 40. In addition, the controller 90 serving as the frost-formation time estimation unit sets the frost-formation time tf to be shorter when the passing wind speed Va of the outside air passing through the external heat exchanger 40 is faster.

With the above-mentioned vehicle air-conditioning device 100, because the frost-formation time tf is set to be shorter when the passing wind speed Va becomes faster and the frost formation tends to progress in a shorter period of time, it is possible to, precisely and in a short period of time, determine that the frost formation is caused.

Second Embodiment

Figure 6:
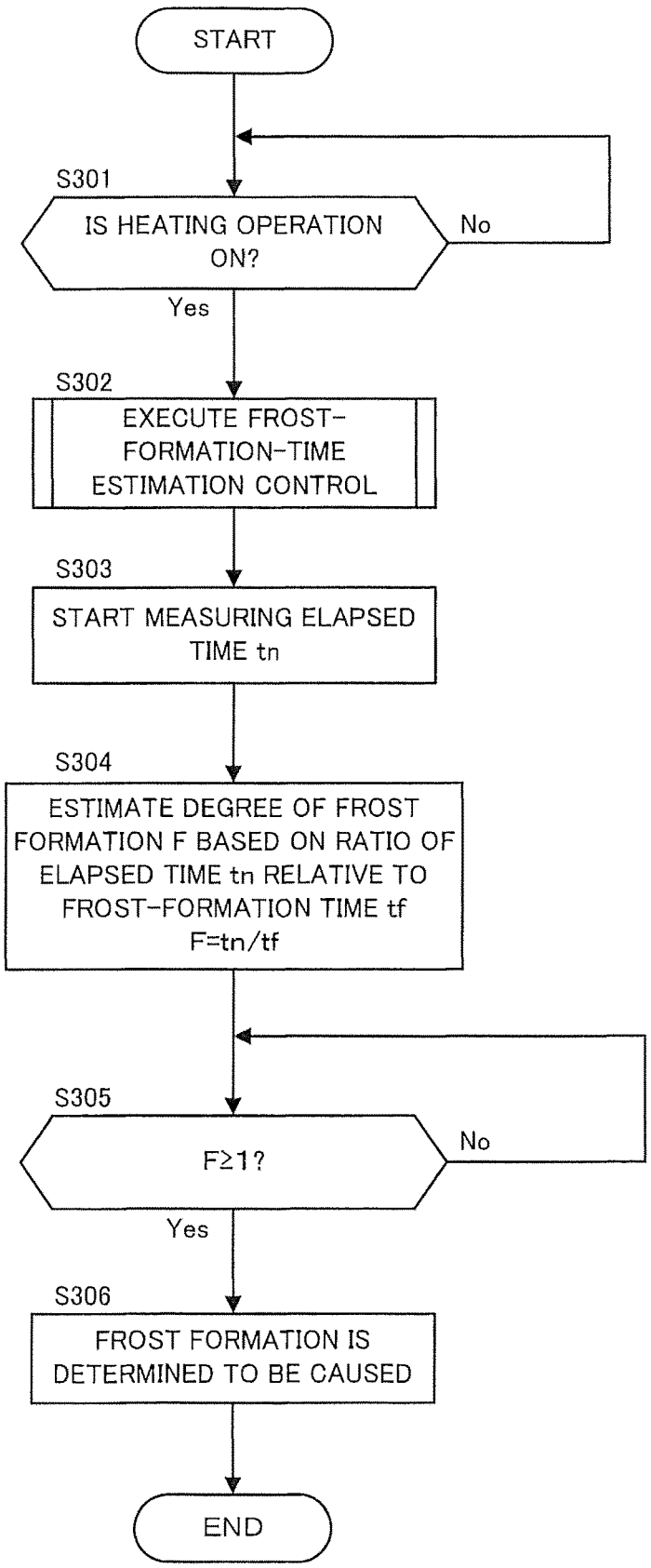
FIG. 6 is a flowchart of the frost-formation determination control executed by the controller of the vehicle air-conditioning device according to a second embodiment of the present invention.

A vehicle air-conditioning device 200 according to a second embodiment of the present invention will be described with reference to FIG. 6. FIG. 6 is a flowchart of the frost-formation determination control executed by the controller 90 of the vehicle air-conditioning device 200. The flowchart in the second embodiment differs from that in the first embodiment in that a degree of frost formation F is estimated from the frost-formation time tf, and a frost-formation determination is executed on the basis of the degree of frost formation F. In the following embodiments, components having the same function as those in the first embodiment are assigned the same reference signs, and explanation will be made by appropriately omitting repetitive descriptions.

In Steps S301 to S303, the controller 90 performs the processes that are the same as those of Steps S101 to S103 in the first embodiment. In the case in which the heating operation is determined as ON in Step S301, the controller 90 executes the frost-formation-time estimation control shown in FIG. 3 in Step S302, and sets the frost-formation time tf. In Step S303, the controller 90 starts to measure the elapsed time tn during which the state in which the temperature difference ΔT between the outside air and the very-low temperature refrigerant is equal to or larger than the frost-formation temperature difference is continued.

In Step S304, the controller 90 obtains the ratio of the elapsed time tn relative to the frost-formation time tf from the elapsed time tn and the frost-formation time tf and estimates the degree of frost formation F. The degree of frost formation F represents a degree of the frost formation caused on the external heat exchanger 40, and can be obtained, for example, by dividing the elapsed time tn by the frost-formation time tf. As described above, the controller 90 functions as a degree-of-frost-formation estimation unit of the vehicle air-conditioning device 200.

In Step S305, the controller 90 determines whether or not the degree of frost formation F reached the frost formation threshold at which the frost formation may be caused to the extent that the heat exchangeability at the external heat exchanger 40 is affected. For example, the frost formation threshold is set to unity. The controller 90 continues to execute the process of Step S305 in the case in which the degree of frost formation F is less than unity, and executes the process of Step S306 in the case in which the degree of frost formation F is equal to or greater than unity.

In Step S306, the controller 90 determines that the frost formation is caused on the external heat exchanger 40. As the frost formation is determined to be caused, the vehicle air-conditioning device 200 appropriately performs process such as the defrosting operation, the heating operation using a separate heat source (not shown), and so forth. As described above, the controller 90 functions as the frost formation determination unit of the vehicle air-conditioning device 200.

Here, the frost-formation determination control executed by the controller 90 of the second embodiment in a running situation of a vehicle will be described. In the case in which the temperature difference ΔT is the first temperature difference ΔT1 and the passing wind speed Va is the first passing wind speed V1, the controller 90 specifies the point A in Step S204 shown in FIG. 3 by referring to the frost-formation-time characteristic table shown in FIG. 5, and derives that the frost-formation time tf is the first frost-formation time tf1.

For example, if the derived first frost-formation time tf1 is assumed to be five minutes and the elapsed time to is assumed to be one minute, the controller 90 estimates that the degree of frost formation F is 0.2 in Step S304 shown in FIG. 6. Thereafter, in Step S305, because the degree of frost formation F is 0.2 and is not equal to or greater than unity, the controller 90 continues to execute the process of Step S305.

In addition, a case in which the running situation of the vehicle is changed, and the temperature difference ΔT has become the second temperature difference ΔT2 that is larger than the first temperature difference ΔT1 and the passing wind speed Va has become V2 that is faster than V1 will be described. The controller 90 specifies the point B in Step S204 shown in FIG. 3 by referring to the frost-formation-time characteristic table shown in FIG. 5, and derives that the frost-formation time tf is the second frost-formation time tf2 that is shorter than the first frost-formation time tf1.

For example, if the derived second frost-formation time tf2 is assumed to be one minute and the elapsed time tn is assumed to be one minute, the controller 90 estimates that the degree of frost formation F is unity in Step S304 shown in FIG. 6. Thereafter, in Step S305, because the controller 90 determines that the degree of frost formation F is unity and is equal to or greater than unity, the process proceeds to the process of Step S306, and it is determined that the frost formation is caused on the external heat exchanger 40.

With the vehicle air-conditioning device 200 according to the above-mentioned second embodiment, following effects can be achieved.

With the vehicle air-conditioning device 200, the controller 90 functions as the frost-formation time estimation unit that estimates the frost-formation time at which the frost formation is caused to the extent that the heat exchangeability at the external heat exchanger 40 is affected, and in addition, the controller 90 functions as the degree-of-frost-formation estimation unit that estimates the degree of frost formation F for the frost formation caused on the external heat exchanger 40 on the basis of the ratio of the elapsed time tn relative to the frost-formation time tf. The controller 90 that functions as the frost-formation time estimation unit estimates the frost-formation time tf to be shorter when the temperature difference $\Delta T$ is larger.

In addition, with the vehicle air-conditioning device 200, in the case in which the degree of frost formation F is equal to or greater than the frost formation threshold (for example 1) at which the frost formation may be caused, the controller 90 serving as the frost formation determination unit determines that the frost formation is caused on the external heat exchanger 40 to the extent that the heat exchangeability at the external heat exchanger 40 is affected.

With the above-mentioned vehicle air-conditioning device 200, because the degree of frost formation F that is estimated on the basis of the ratio of the elapsed time to relative to the frost-formation time tf is used, even when the temperature difference $\Delta T$ reaches or exceeds the frost-formation temperature difference temporarily, it is possible to precisely determine occurrence of the frost formation without performing the erroneous determination. In addition, because it is determined that the frost formation is caused when the degree of frost formation F is equal to or greater than the frost formation threshold of unity at which the frost formation may be caused, it is possible to directly use the degree of frost formation F in a percentage expression etc., and it is possible to easily check how much the frost formation has been progressed.

For example, it may be determined that the frost formation is caused on half of the external heat exchanger 40 in the case in which the degree of frost formation F at which the frost formation may be caused is 0.5. When performing such a determination, depending on the degree of the degree of frost formation F, it is possible to variably perform the determination on how much the frost formation has been caused in an appropriate manner.

By calculating the degree of frost formation F in such a manner, it is possible to set a defrosting time depending on the degree of frost formation F, and thereby, it is possible to estimate electrical power consumption for the defrosting operation.

Third Embodiment

Figure 7:
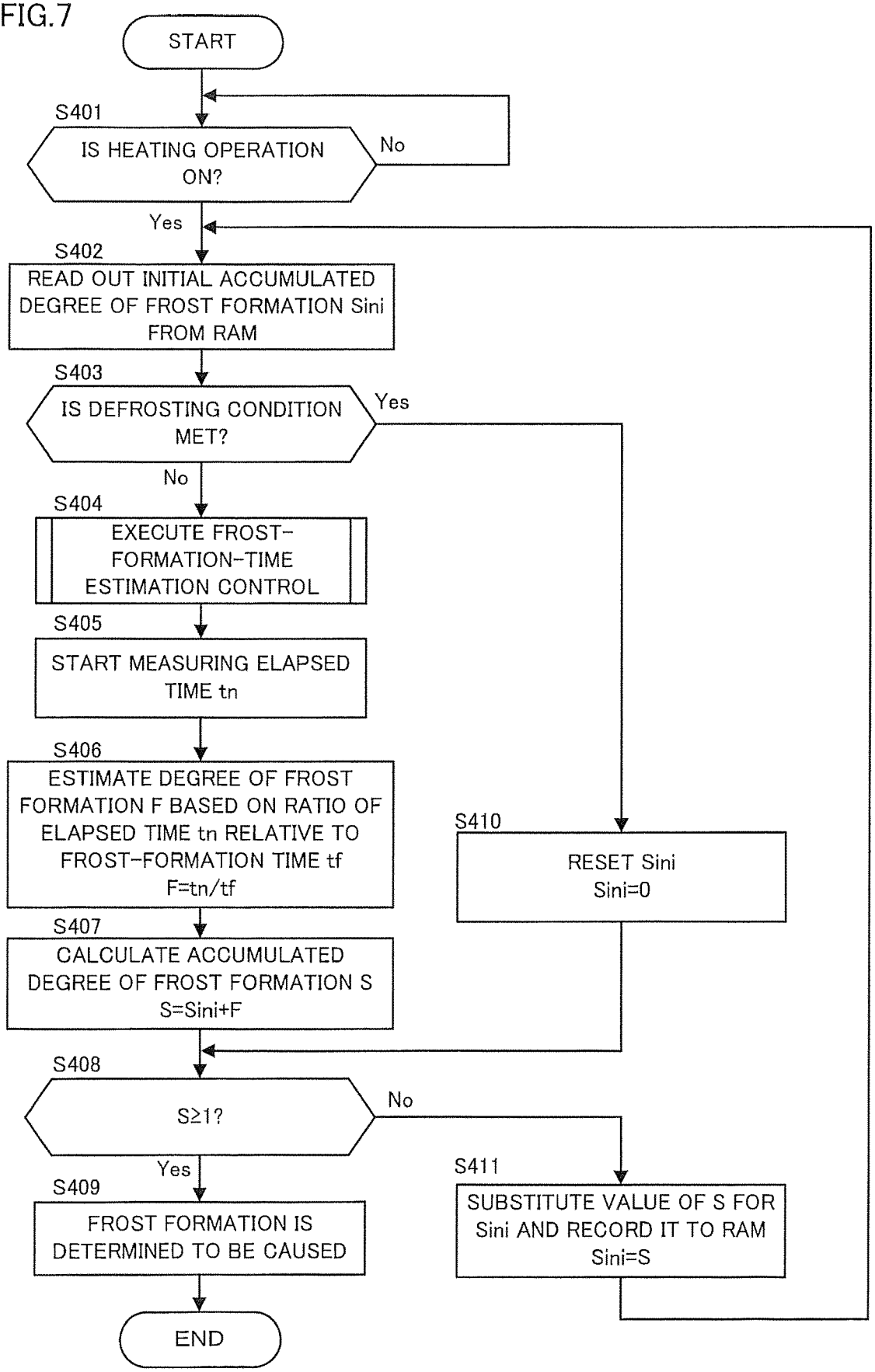
FIG. 7 is a flowchart of the frost-formation determination control executed by the controller of the vehicle air-conditioning device according to a third embodiment of the present invention.

A vehicle air-conditioning device 300 according to a third embodiment of the present invention will be described with reference to FIG. 7. FIG. 7 is a flowchart of the frost-formation determination control executed by the controller 90 of the vehicle air-conditioning device 300. In the flowchart in the third embodiment differs from those in the first embodiment and the second embodiment in that the frost-formation determination is executed by calculating an accumulated degree of frost formation S from the degree of frost formation F estimated.

In Step S401, the controller 90 performs the process that is the same as that of Step S101 in the first embodiment, and in the case in which the heating operation is ON, executes the process of Step S402.

In Step S402, the controller 90 reads out an initial accumulated degree of frost formation Sini from the RAM. The initial accumulated degree of frost formation Sini represents the integrated value of the degree of frost formation F, and the controller 90 reads out the latest value recorded to the RAM.

In Step S403, the controller 90 determines whether or not a defrosting condition is met. The defrosting condition is met, for example, in the cases in which the defrosting operation is performed, the outside temperature Ta is sufficiently high at the time of start up, the cooling operation is continued for a predetermined period of time, and so forth. In the case in which the defrosting condition is met, the external heat exchanger 40 is under a state in which the frost formation is not caused, and the controller 90 executes the process of Step S410. In the case in which the defrosting condition is not met, the controller 90 executes the process of Step S404.

In Step S404, the controller 90 executes the frost-formation-time estimation control shown in FIG. 3 that is the same process as that of Step S102 in the first embodiment and Step S302 in the second embodiment. In the frost-formation-time estimation control, the controller 90 obtains the temperature difference $\Delta T$ between the outside air and the refrigerant and sets the frost-formation time tf.

In Step S405, the controller 90 performs the process that is the same as that of Step S103 in the first embodiment and Step S303 in the second embodiment, and starts to measure the elapsed time tn during which the state in which the temperature difference $\Delta T$ between the outside air and the very-low temperature refrigerant is equal to or larger than the frost-formation temperature difference is continued.

In Step S406, from the elapsed time tn and the frost-formation time tf, the controller 90 estimates the degree of frost formation F at which the frost formation is caused on the external heat exchanger 40 on the basis of the ratio of the elapsed time tn relative to the frost-formation time tf. The degree of frost formation F can be obtained by, for example, dividing the elapsed time tn by the frost-formation time tf (F=tn/tf). As described above, the controller 90 functions as the degree-of-frost-formation estimation unit of the vehicle air-conditioning device 300.

In Step S407, the controller 90 calculates the accumulated degree of frost formation S. The accumulated degree of frost formation S is the integrated value of the degree of frost formation F updated by the frost-formation determination control executed by the controller 90, and is calculated by adding the degree of frost formation F to the initial accumulated degree of frost formation Sini and calculated by using Equation 1 shown below.

$$S=\Sigma F=\text{Sini}+F \qquad \text{Equation 1}$$

In Step S408, the controller 90 determines whether or not the accumulated degree of frost formation S is equal to or greater than the frost formation threshold. For example, the frost formation threshold is set to unity. The controller 90 executes the process of Step S409 in the case in which the accumulated degree of frost formation S is equal to or greater than unity, and executes the process of S411 in the case in which the accumulated degree of frost formation S is less than unity.

In Step S409, the controller 90 determines that the frost formation is caused on the external heat exchanger 40. As the frost formation is determined to be caused, the vehicle air-conditioning device 300 appropriately performs process such as the defrosting operation, the heating operation using a separate heat source (not shown), and so forth. As described above, the controller 90 functions as the frost formation determination unit of the vehicle air-conditioning device 300.

In Step S410, because the defrosting condition is met by the process of Step S403, the controller 90 resets the initial accumulated degree of frost formation Sini to zero. Thereafter, the controller 90 proceeds to the process of Step S408.

In Step S411, the controller 90 substitutes the value of the accumulated degree of frost formation S calculated in Step S407 for the initial accumulated degree of frost formation Sini and record it to the RAM. Thereafter, the controller 90 proceeds to the process of Step S402.

Here, the frost-formation determination control executed by the controller 90 of the third embodiment in a running situation of a vehicle will be described.

When the heating operation is determined to be operated in Step S401, the initial accumulated degree of frost formation Sini is read out from the RAM in Step S402. The initial accumulated degree of frost formation Sini is the final value of the preceding process, and is assumed to be zero, for example. In addition, the temperature difference $\Delta T$ is assumed to be the first temperature difference $\Delta T1$, and the passing wind speed Va is assumed to be the first passing wind speed V1. The controller 90 executes the frost-formation-time estimation control of Step S404, specifies the point A in Step S204 shown in FIG. 3 by referring to the frost-formation-time characteristic table shown in FIG. 5, and derives that the frost-formation time tf is the first frost-formation time tf1.

For example, in the case in which the derived first frost-formation time tf1 is five minutes and the elapsed time to is one minute, the controller 90 estimates that the degree of frost formation F is 0.2 in Step S406. Thereafter, the controller 90 calculates the accumulated degree of frost formation S in Step S407. The value "0.2" of the degree of frost formation F is added to the value zero of the initial accumulated degree of frost formation Sini, and thereby, the value of the accumulated degree of frost formation S is obtained as 0.2. The controller 90 determines that the accumulated degree of frost formation S is 0.2 and is not equal to or greater than unity in Step S408, and proceeds to the process of Step S411. In Step S411, the controller 90 substitutes the value "0.2" of the accumulated degree of frost formation S calculated in Step S407 for the initial accumulated degree of frost formation Sini and records it to the RAM.

Next, a case in which the running situation of the vehicle is further changed after Step S407 will be described. The process proceeds to Step S402, and the controller 90 reads out the value "0.2" of the initial accumulated degree of frost formation Sini recorded in the preceding process from the RAM. In addition, the temperature difference $\Delta T$ is assumed to be the second temperature difference $\Delta T2$ that is larger than the first temperature difference $\Delta T1$, and the passing wind speed Va is assumed to be V2 that is faster than V1. The controller 90 executes the frost-formation-time estimation control of Step S404, specifies the point B in Step S204 shown in FIG. 3 by referring to the frost-formation-time characteristic table shown in FIG. 5, and derives that the frost-formation time tf is the second frost-formation time tf2 that is shorter than the first frost-formation time tf1.

For example, In the case in which the derived second frost-formation time tf2 is one minute and the elapsed time tn is further extended by one minute, the controller 90 re-measures the elapsed time tn as one minute in Step S405 and estimates that the degree of frost formation F is unity in Step S406. Thereafter, in Step S407, the controller 90 calculates the accumulated degree of frost formation S. The value unity of the degree of frost formation F is added to the value "0.2" of the initial accumulated degree of frost formation Sini, and thereby, the value of the accumulated degree of frost formation S is obtained as 1.2. In Step S408, the controller 90 determines that the accumulated degree of frost formation S is 1.2 and is equal to or greater than unity, and proceeds to the process of Step S409. In Step S409, the controller 90 determines that the frost formation is caused on the external heat exchanger 40. As described above, the controller 90 re-measures the elapsed time tn every time in the process of Step S405, and estimates the degree of frost formation F for every elapsed time tn in the process of Step S406.

With the vehicle air-conditioning device 300 according to the above-mentioned third embodiment, following effects can be achieved.

With the vehicle air-conditioning device 300, the controller 90 serving as the degree-of-frost-formation estimation unit estimates the degree of frost formation F for every elapsed time tn on the basis of the ratio of the elapsed time tn relative to the frost-formation time tf, the controller 90 serving as the frost formation determination unit calculates the accumulated degree of frost formation S as the integrated value by integrating the degree of frost formation F estimated for every elapsed time tn, and in the case in which the accumulated degree of frost formation S is equal to or greater than the value unity of the frost formation threshold at which the frost formation may be caused, the controller 90 determines that the frost formation is caused on the external heat exchanger 40.

According to the above-mentioned vehicle air-conditioning device 300, because the frost-formation determination is performed on the basis of the accumulated degree of frost formation S that is calculated by integrating the degree of frost formation F estimated for every elapsed time tn, it is possible to perform the frost-formation determination by taking all of the progressing states of the frost formation for every elapsed time tn into account. Therefore, even when the frost-formation time tf is changed every time in accordance with the change in the running situation of the vehicle for every elapsed time tn, it is possible to ascertain how much the frost formation has been progressed, and to precisely determine the occurrence of the frost formation.

With the vehicle air-conditioning device 300, in the case in which the defrosting condition is met where there is no frost formation, the controller 90 serving as the frost formation determination unit resets the initial accumulated degree of frost formation Sini that is the integrated value obtained by integrating the degree of frost formation F estimated for every elapsed time tn.

According to the above-mentioned vehicle air-conditioning device 300, because it is possible to resets the initial accumulated degree of frost formation Sini in the case in which the defrosting condition is met and the frost formation is not caused on the external heat exchanger 40, it is possible to calculate the accumulated degree of frost formation S again. Therefore, in the case in which the frost formation is not caused, it is possible to precisely determine the occurrence of the frost formation without performing erroneous determination that the accumulated degree of frost formation S reaches or exceeds the frost formation threshold and the frost formation is caused.

Although the embodiments of the present invention have been described in the above, the above-mentioned embodiments merely illustrate a part of application examples of the present invention, and the technical scope of the present invention is not intended to be limited to the specific configurations in the above-mentioned embodiments.

For example, instead of using the exit-side refrigerant temperature sensor 92, a pressure sensor may be used to determine the temperature. Because the pressure of the refrigerant can be converted to the temperature of the refrigerant on the basis of the refrigerant characteristics, as described in the above-mentioned embodiments, it is possible to calculates the temperature difference ΔT between the outside air and the refrigerant and to determine whether the frost formation is caused.

This application claims priority based on Japanese Patent Application No. 2014-260763 filed with the Japan Patent Office on Dec. 24, 2014, the entire contents of which are incorporated into this specification.

The invention claimed is:

1. A heat pump type vehicle air-conditioning device provided with an external heat exchanger performing heat exchange between refrigerant flowing inside thereof and outside air;
an outside air temperature sensor;
an exit-side refrigerant temperature sensor; and
a vehicle speed sensor, comprising:
   a controller comprising a wind speed table, configured to
      calculate a temperature difference between exit-side refrigerant in the external heat exchanger and the outside air;
      determine that frost formation is caused on the external heat exchanger based on an accumulated time of a state in which the temperature difference at time of a heating operation is equal to or larger than a frost-formation temperature difference at which the frost formation is caused on the external heat exchanger;
      estimate a frost-formation time at which frost formation is caused, the frost-formation time being a time when water vapor at the external heat-exchanger becomes frozen, the frost-formation time being based on the temperature difference between the exit-side refrigerant and the outside air, and the frost-formation time being estimated to be shorter when the temperature difference is larger; and
      determine that, in a case in which the accumulated time is equal to or longer than the frost-formation time, the frost formation that affects the heat exchangeability at the external heat exchanger is caused.

2. The vehicle air-conditioning device according to claim 1, wherein the frost-formation time is changed by a passing wind speed of the outside air passing through the external heat exchanger.

3. The vehicle air-conditioning device according to claim 1, wherein the frost-formation time is changed based on the temperature difference between the exit-side refrigerant and the outside air and by a passing wind speed of the outside air passing through the external heat exchanger.

4. The vehicle air-conditioning device according to claim 1,
wherein the controller is configured to
   estimate a degree of frost formation of the frost formation caused on the external heat exchanger based on a ratio of the accumulated time relative to the frost-formation time.

5. The vehicle air-conditioning device according to claim 4, wherein the controller is configured to estimate that the frost formation is caused on the external heat exchanger when the degree of frost formation is equal to or greater than a frost formation threshold.

6. The vehicle air-conditioning device according to claim 5, wherein the controller is configured to
   estimate the degree of frost formation for every accumulated time based on the ratio of the accumulated time relative to the frost-formation time,
   calculate an integrated value by integrating the degree of frost formation estimated for every accumulated time; and
   determine whether the integrated value is equal to or greater than the frost formation threshold.

7. The vehicle air-conditioning device according to claim 6, wherein
   the controller is configured to reset, in a case in which a defrosting condition is met and in which there is no frost formation, the integrated value obtained by integrating the degree of frost formation estimated for every accumulated time.

8. The vehicle air-conditioning device according to claim 2, wherein
   the frost-formation time is estimated to be shorter when the passing wind speed is faster.

9. The vehicle air-conditioning device according to claim 3, wherein
   the frost-formation time is estimated to be shorter when the passing wind speed is faster.

10. A method of operating a heat pump type vehicle air-conditioning device provided with an external heat exchanger performing heat exchange between refrigerant flowing inside thereof and outside air, comprising:
   calculating a temperature difference between exit-side refrigerant in the external heat exchanger and the outside air;
   calculating an accumulated time of a state in which the temperature difference at time of a heating operation is equal to or larger than a frost-formation temperature difference, the frost-formation temperature difference being a temperature difference that causes the frost formation on the external heat exchanger;
   estimating a frost-formation time at which frost formation is caused, the frost-formation time being a time when water vapor at the external heat-exchanger becomes frozen, the frost-formation time being based on the temperature difference between the exit-side refrigerant and the outside air, and the frost-formation time being estimated to be shorter when the temperature difference is larger; and determining when the accumulated time becomes equal to or longer than the frost-formation time.

11. The method of claim 10, further comprising performing a defrosting operation when the accumulated time is equal to or longer than the frost-formation time.

\* \* \* \* \*